(12) United States Patent
Kreschel et al.

(10) Patent No.: US 9,575,483 B2
(45) Date of Patent: Feb. 21, 2017

(54) PROFILE GAUGE, MEASURING DEVICE EQUIPPED WITH THE PROFILE GAUGE, AND MEASUREMENT METHOD

(71) Applicant: GLEASON-PFAUTER MASCHINENFABRIK GMBH, Ludwigsburg (DE)

(72) Inventors: Juergen Kreschel, Asperg (DE); Edgar Weppelmann, Asperg (DE)

(73) Assignee: Gleason-Pfauter Maschinenfabrik GmbH, Ludwigsburg (DE)

(*) Notice: Subject to any disclaimer, the term of this patent is extended or adjusted under 35 U.S.C. 154(b) by 351 days.

(21) Appl. No.: 14/216,113

(22) Filed: Mar. 17, 2014

(65) Prior Publication Data
US 2015/0081083 A1    Mar. 19, 2015

(30) Foreign Application Priority Data
Sep. 13, 2013   (DE) .................. 10 2013 015 253

(51) Int. Cl.
*B23Q 17/22* (2006.01)
*G05B 19/18* (2006.01)
(Continued)

(52) U.S. Cl.
CPC .............. *G05B 19/182* (2013.01); *B23F 5/163* (2013.01); *B23F 23/12* (2013.01); *B23Q 17/20* (2013.01);
(Continued)

(58) Field of Classification Search
None
See application file for complete search history.

(56) References Cited

U.S. PATENT DOCUMENTS 2,679,109 A    5/1954   Reynolds
5,271,271 A    12/1993  Frazier

FOREIGN PATENT DOCUMENTS

DE    1427263 A    10/1969
DE    1627379 A    5/1970
(Continued)

OTHER PUBLICATIONS

Translation for JPH07102483, Nov. 1995.*
(Continued)

*Primary Examiner* — Robert R Raevis
(74) *Attorney, Agent, or Firm* — Robert L. McDowell

(57) ABSTRACT

A profile gauge that embodies a measurement geometry for a tool that has a toothed profile designed in particular for the skiving of toothed work pieces, wherein the profile gauge serves to determine at least one measurement quantity which can be used for a machining process, specifically a skiving process, that is to be performed with the tool and wherein, in a phase of said process, the toothed profile of the work piece that is to be generated is formed by a meshing engagement with the teeth of the tool, wherein the profile gauge is distinguished by having a toothed profile section with which, for determining the measurement quantity, the teeth of the tool are brought into a meshing engagement that corresponds to the tooth engagement between the tool and the work piece during the profile-forming phase. The invention further concerns a measuring device and a measurement method.

14 Claims, 18 Drawing Sheets

(51) Int. Cl.
*B23F 23/12* (2006.01)
*B23Q 17/20* (2006.01)
*G01B 5/20* (2006.01)
*B23F 5/16* (2006.01)

(52) U.S. Cl.
CPC ....... *G01B 5/20* (2013.01); *G05B 2219/35035* (2013.01)

(56) References Cited

FOREIGN PATENT DOCUMENTS

EP          2537615  A1    12/2012
JP          H07-102483  B    11/1995

OTHER PUBLICATIONS

International Search Report and Written Opinion for PCT/EP2014/002394, ISA/EPO, Mar. 30, 2015, pp. 12, with English translation.
Search Report for DE 102013015253.4, GPTO, Mar. 4, 2014, pp. 5, with English translation.

* cited by examiner

A = one-half specified ball gauge diameter of internal toothed profile
B = measured distance from the back surface of the prism to the ball
C = distance from the back surface of the prism to the work piece axis

PROFILE GAUGE, MEASURING DEVICE EQUIPPED WITH THE PROFILE GAUGE, AND MEASUREMENT METHOD

This application claims the benefit of German Patent Application No. DE 102013015253.4 filed Sep. 13, 2013, the disclosure of which is hereby incorporated by reference in its entirety.

BACKGROUND OF THE INVENTION

The primary subject of the invention is a profile gauge that embodies a measurement geometry for a tool that has a toothed profile designed for the skiving of toothed work pieces, wherein the profile gauge serves to determine at least one measurement quantity which can be used for a skiving process that is to be performed with the tool and wherein, in a phase of said process, the toothed profile to be generated on the work piece is formed by a meshing engagement with the teeth of the tool. The invention further encompasses a measuring device equipped with the profile gauge as well as a measurement method that is based on the profile gauge. More generally, the invention for which protection is sought concerns profile gauges for tools with geometrically defined cutting edges designed to generate and/or finish toothed profiles through rolling engagement with the work piece.

In the skiving (also referred to as "power skiving") of toothed work pieces with skiving wheels designed for this purpose, the dimensions of the skiving wheels as specified by their respective manufacturers enter directly or indirectly into the control settings for the skiving process.

Typically, the manufacturers will specify the outside diameter of the skiving wheel (measured at the tips of the teeth) as well as the height of the tool.

Other measurement methods which are used, e.g., for the contact measurement in the gear-shaping process, such as taking the measurements of the generating cutter, for example with a defined roller, based on which the dimensions of the tool are calculated, are only of limited use for skiving wheels, as the evaluation of such measurements is extremely complex and requires a multitude of input data.

In the just-mentioned gear-shaping process, the cutting edge of the generating cutter wheel as seen in the direction of its axis represents the geometry of a toothed profile of a spur gear in a transverse sectional plane, wherein said spur gear is meshing with the work piece in process like one gear with another (in the case of a straight-toothed cutter wheel). Or in the case of helical generating cutter wheels, at least the contour of the cutting edge as seen perpendicular to the surface normal and along the tooth trace represents the geometry of a toothed profile of a helical gear in a normal section, wherein said helical gear is meshing with the work piece in process like one helical gear with another. In contrast to these situations, the shape of the cutting edge of a skiving wheel will be different from the shape of the tooth gap to be cut in accordance with a specified tooth geometry. Given that in a skiving process, the respective axes of rotation of the work piece and of the tool will cross each other at an angle that is normally set between 10 and 30 degrees, a skiving wheel will for example no longer conform to an involute tooth shape as was the case with the generating cutter wheels mentioned above. As the power-skiving process can be expected to be known to practitioners in this field, further details will not be entered into at this point. A clear presentation of the process can be found in EP 2 537 615 A1.

Because of the reason that has just been explained, the information provided by manufacturers of skiving wheels will normally be limited to the diameter and the height. It has been found, however, that even with the knowledge of these dimensions of the skiving wheel there may be rejects in particular at the beginning of a production run of a series of tooth-profiled work pieces, as the latter can be out of tolerance in several different aspects, for example by being undersized in the base tangent length. In practice, the work pieces are brought to a measurement room where the measurements are taken. Based on the measurement results obtained thereby, corrections are made in the settings of the machine tool for the power-skiving process.

In view of the problems involved in the foregoing conventional procedure, the objective of the present invention is to simplify the practice of the power-skiving process in regard to the aforementioned aspects and to improve the power-skiving process, aiming in particular for high quality of the tooth-profiles produced, preferably already in the first piece of a manufacturing run.

SUMMARY OF THE INVENTION

To solve this task, the invention provides a profile gauge which embodies a measurement geometry as stated hereinabove, which is characterized by a toothed profile section with which, for determining the measurement quantity, the teeth of the tool are brought into a meshing engagement that is representative of the tooth engagement between the tool and the work piece during the profile-forming phase.

Accordingly, the profile gauge is designed so that this agreement between the toothed profile engagements exists as soon as the toothed profile of the tool is brought into meshing engagement with the profile gauge prior to taking the measurement.

For the sake of simplicity, the following description of the invention refers to the skiving process, which is where the advantages of the invention manifest themselves most strongly, even though the invention can certainly be applied to the generating methods specified in the claims, in particular for generating cutter wheels with helical teeth.

Due to the agreement between the engagement of the toothed profile of the skiving wheel with the toothed profile of the profile gauge on the one hand and the engagement of the toothed profile of the work piece and the toothed profile of the tool during the profile-forming phase, a situation is created which duplicates the minimal distance between the respective axes of the work piece and the skiving wheel, because in the profile-forming phase this very same minimal distance exists between the axes of the skiving wheel and the work piece. For an image of the situation, one should think of the profile gauge as having an axis that identically corresponds to the axis of the work piece.

By allowing a determination of the true minimal distance between axes, i.e. the minimal distance between tool axis and work piece axis in the last profile-forming step, this concept succeeds in particular in making it possible to determine the correct parameter values that have to be entered for the machine settings in the skiving process. Until now, being mindful of the complex contact situation between the skiving wheel and the work piece during the profile-forming generating movement in the skiving process, it was normally impossible to draw any firm conclusion in regard to this axis distance based only on the measured and available outside diameter of the skiving wheel.

In a particularly preferred embodiment of the invention, the toothed profile section of the profile gauge duplicates at least a section of the tooth flanks of the tooth system of the work piece. In addition, producing such a profile gauge is straightforward, as the contour of the work piece is normally predefined, for example through specifications set by the prospective user of the toothed work pieces that are to be manufactured.

As a preferred embodiment, it is envisioned that the at least sectional duplication includes at least one left flank and one right flank of the toothed profile of the work piece. For a convenient measurement (in particular of the dimension "B" in FIG. 4), it is advantageous if the at least sectional duplication includes two tooth flanks that face each other, in particular across a gap, or also two tooth flanks facing away from each other and belonging to separate teeth. It is further preferred if the at least sectional duplication includes all four tooth flanks of two consecutive teeth, in particular no more and no less than these four flanks. However, the at least sectional duplication can also have asymmetrically distributed flanks, as long as the latter are located in the profile-forming zone of the generating movement. For example, one could also use two teeth spaced apart from each other by one or more tooth positions. Already if the at least sectional duplication includes the tooth flanks of one tooth, or two, three or more tooth flanks among which there is at least one right and one left tooth flank, it is possible to achieve advantageous results. In this regard, there are no further limitations on the invention.

In an advantageous embodiment, the profile gauge can have a base which carries on one side the toothed profile section. For the other side (backside) a planar surface configuration is preferred for a convenient way of seating the profile gauge in a measuring device, but also for defining a measurement reference location for the profile gauge. The base and the toothed profile section can be in particular of a materially continuous (monolithic) construction.

In a particularly preferred embodiment of the invention, it is envisioned that a measurement quantity contains information on the distance between the axis of rotation of the tool (skiving wheel) and a first reference associated with the profile gauge, wherein the first reference can for example be the back surface of the base. From this information the axis distance can be directly determined with the additional, easily obtained knowledge of the distance of this first reference from the axis of the work piece which can in thought be substituted for the profile gauge as explained above and also later in the paragraphs supporting the methods claims.

A particularly preferred embodiment of the profile gauge includes positioning element which projects on the side of the toothed profile section and one of whose spatial dimensions extends in the direction of the height of the teeth of the toothed profile section. The positioning element is particularly configured in the shape of a post and can preferably be oriented with the post axis orthogonal to the back surface of the base. This positioning element provides a contact surface for the cutting edge of the tooth top of the tool, particularly at its outside diameter, in the engagement of the teeth. Based on the contact that is thereby established between the positioning element and the cutting edge of the skiving wheel, further advantageous measurement information becomes available.

Accordingly, it is envisioned that one measurement quantity includes the distance in height between the contact area of the positioning element and a second reference, which is associated with the tool. The second reference can for example be the backside of the skiving wheel or also for example the backside of a holder in which the tool is seated, for example a clamping chuck for the skiving wheel. Where exactly one chooses to arrange the reference for the tool is of secondary importance as long as the measurement can be converted easily into the height information required for the setting of the machine. Under this aspect, the aforementioned examples for the location of the second reference certainly suggest themselves.

It was important to recognize that the height of the tool from a point of the cutting edge at the outside diameter of the skiving wheel to its backside can in many cases not be measured directly, as the tooth center line which intersects the cutting edge at the tooth top cannot be easily determined and defined with optical or mechanical measuring equipment. Without the measurement according to the present invention, the skiving process has thus been lacking a reference regarding the exact point at the tooth top on which the height of the skiving wheel to its backside should be based, also particularly for the reason that in the current situation the customer using the skiving wheel on the skiving machine had no background information on how the tooth depth had been determined.

Further within the scope of the invention, it was also discovered that the value which has until now been measured and provided for the height of the tool as explained hereinabove is not sufficient for a clear conclusion as to which tool height is being specified that is actually relevant for setting up a machine, i.e. the axial distance from the point which lies on the cutting edge and on the outside diameter of the skiving wheel for example to the backside of the skiving wheel. In connection with this issue, it is also practical to arrange the positioning post midway relative to the direction of the tooth width, between the two teeth of the toothed profile section of the profile gauge. At this point it is again of primary importance to establish a clearly defined point of contact with the cutting edge, from which the required information for the settings of the machine can be determined. It will be immediately obvious to a practitioner that this can also be achieved with a step-ground skiving wheel. The positioning element in cross-section should preferably have a curved contour. In particular, one might select a post-like positioning element of circular cross-section.

It is further envisioned in the invention that a measurement quantity contains information regarding the angular position of the contact area of the positioning element relative to a third, azimuthal reference associated with the tool, which can for example be constituted by a geometrical feature of the tool that interrupts the rotational symmetry of the latter, for example a groove on the backside of the skiving wheel. This can be relevant in power skiving if the toothed profile is to be generated/positioned in a specified positional relationship to another toothed profile or geometric feature of the work piece. For example, in skiving processes that are performed on the basis of conventional information, it is possible that production parts may have to be scrapped although they are within tolerance relative to tooth quality and tooth width, if an error is found in the position of the toothed profile generated by the skiving process relative to the position of a further profile that is already present on the work piece. This problem can be solved based on the angular position determined according to the invention. The specific choice of the azimuthal reference is again of no relevance to the measurement itself, as long as the ultimately required relative angular position can be derived from it. For example, a geometrical feature on the backside of the skiving wheel holder on which the skiving wheel is mounted could be used as azimuthal reference and measured for this purpose.

It is preferred to determine the measurement quantity associated with the minimal axis distance as well as the measurement quantity associated with the relevant tool height. In addition, if a specified angular position of the toothed profile to be generated on the work piece has to be met, the respective measurement quantity is preferably determined likewise as the third measurement quantity.

A measuring device according to the invention is distinguished in that it includes a profile gauge according to one or more of the aspects explained above as well as a holder for the tool that is designed to perform the skiving process (skiving wheel), wherein the spatial relationship between the profile gauge and the tool holder is variable.

The measuring device should preferably allow the holder to turn about an axis of rotation. As usual, it is of advantage if this axis coincides with the axis of rotation of the skiving wheel. To facilitate the aforementioned measurement of the angular position, a rotary position transducer is preferably arranged at the axis of rotation. Due to the rotary degree of freedom, it is no longer necessary to clamp the skiving wheel exactly in the angular position required for the tooth engagement with the profile gauge.

A particularly preferred embodiment of the measurement device provides the capability to change a radial distance between tool and profile gauge, specifically along a first axis of linear movement. This makes it easy to establish the engagement between the toothed profiles.

To facilitate the setting up of the contact between the positioning element and the skiving wheel, the position of the profile gauge relative to the direction of the tool axis is preferably adjustable. This adjustment takes place preferably along a second axis of linear movement which can advantageously be oriented parallel to the axis of rotation.

If all of the aforementioned axes are realized, the engagement between the respective toothed profiles of the skiving wheel and the profile gauge can be established in a particularly simple procedure wherein first the skiving wheel is set into position but left free to rotate about the axis of rotation. Next, the radial movement is performed while there is still a sufficient distance between the positioning post and the skiving wheel. At the appropriate time prior to engagement, the rotary position is set for a collision-free radial entry of the skiving wheel into the profile gauge. As a last step, through a displacement along the second axis of linear movement, the contact between the positioning post and the cutting edge of the skiving wheel is established. The manipulations required for this procedure can be performed either entirely by hand, manually guided but assisted by motors, or entirely by motors.

The measuring device advantageously includes a control device through which the determination and/or storage of the measurement information is performed in the normal way that is common to measuring devices. The choice of measurement axes that suggests itself includes the two axes of linear movement as well as the rotary axis, depending on the preferred way of providing the aforementioned measurement quantities.

According to a further developed aspect of the invention, the holder device which directly supports the skiving wheel is to be designed so that it can be taken off the measurement device and installed on a skiving machine together with the securely clamped tool. Thus, as the clamped connection of the skiving wheel to the holder device is not subjected to any change between the measurement in the measuring device and the skiving process, even minimal errors related to the mounting connection are precluded and an additional degree of precision is gained.

From a systems-engineering point of view, the scope of protection sought for the invention further includes a skiving machine in which the commands of the controller for carrying out a skiving process are dependent on at least one measurement quantity that is determined with at least one measuring device according to the invention, and it also includes a system in which a measuring device according to the invention is combined with a skiving machine. Preferably in such a system the measuring device and the skiving machine can have interchangeable tool holder devices and/or coupled or combined controllers.

From a process-engineering point of view, the task set for the invention is solved by a measurement method for a tool with an arrangement of teeth designed for the machining of work pieces with toothed profiles through a skiving process, wherein by said measurement method at least one measurement quantity is determined which is usable for a skiving process that is to be performed with said tool, and wherein the method is in essence distinguished by the fact that during a phase of the skiving process the profile of the tooth arrangement to be generated on the work piece is formed through meshing engagement with the toothed profile of the tool.

The advantages of the measurement method according to the invention follow from the advantages explained above for the profile gauge and the measuring device according to the invention.

Accordingly, the at least one measurement quantity can contain information regarding the distance between the rotary axis of the tool and a first reference associated with the profile gauge. Based on the information relative to this distance, the (minimal) axis distance can be determined, i.e. the distance between the respective axes of rotation of the work piece and the tool during the profile-generating phase. To determine this measurement quantity, another geometrical reference element, for example a cylindrical roller or a spherical ball, in relation to which for example the ball gauge diameter of the work piece is known or in any case determinable, can be brought into engagement with the tooth gap of the profile gauge and a distance, for example between the ball and the first reference of the profile gauge, can be determined. The minimal axis distance is then obtained by taking the sum of one-half the ball gauge diameter and the distance between the ball and the first reference and subtracting from this the distance between the tool axis (skiving wheel axis) and the first reference. This makes it evident that the exact location of the first reference is irrelevant for the determination of the minimum axis distance.

The at least one measurement information can further relate to a height of a contact point of the positioning element with the cutting edge of the tooth top of the tool, in particular at the outside diameter of the tool, relative to a second reference associated with the tool and/or an angular position of the point of contact relative to a third reference associated with the tool, as has already been explained above.

Further from a process-engineering point of view, the scope of protection sought for the invention also includes a skiving method which is performed with a control command that depends on measurement information gained by a measurement method according to the aforementioned aspects of the invention. The skiving process can include the feature that a mounting connection of the tool (skiving wheel) to the holder device that directly supports the tool is not released between the measurement process and the skiving process.

BRIEF DESCRIPTION OF THE DRAWINGS

Further distinguishing features, details and advantages of the invention will become evident from the following description which refers to the attached drawings, wherein.

DETAILED DESCRIPTION OF THE INVENTION

Figure 1:
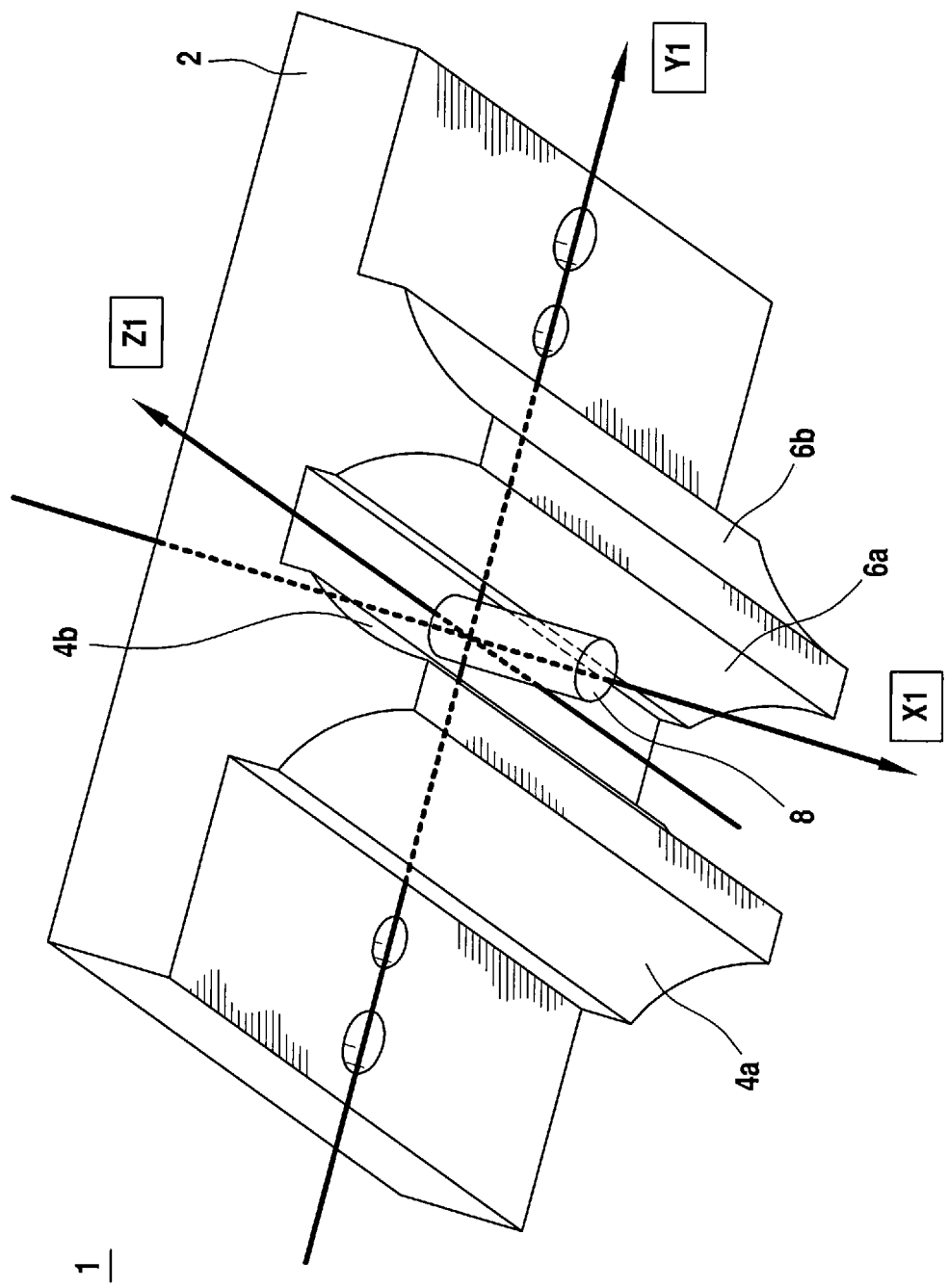
FIG. 1 shows a profile gauge in a perspective view.

The profile gauge 1 which is shown in a perspective view in FIG. 1, which will hereinafter also be referred to as "prism" (using an in-house term of the applicant), has in this embodiment a base 2 in the shape of a rectangular block with a plane surface on its backside 3 which can be seen more clearly in FIG. 2. On the other side of the prism 1, two teeth 4 and 6 are formed, whose tooth flanks 4a, 4b and 6a, 6b are in this embodiment an exact image of the flanks in a toothed profile of a work piece that are to be machined in a skiving process with the tool that is to be measured.

For the purposes of the present description, a coordinate system with the axes X1, Y1 and Z1 can be defined for the prism 1, wherein the axes Y1 and Z1 define a plane that is parallel to the backside 3, while the axis X1 extends perpendicular to the backside 3. Furthermore, the axis Z1 extends in the direction of the tooth width of the teeth 4, 6, while the axis Y1 is oriented perpendicular to the tooth width direction as well as to the tooth depth direction X1.

In addition, the axis X1 extends in the center between the teeth 4, 6 and will in the following also be referred to as the central axis of the prism. It also defines the lowest point (relative to the axis Z1) of a post-shaped positioning element 8 which extends in the center between the teeth 4, 6, perpendicular to the backside 3 of the prism 1, and which will be explained later herein. In addition, the drawing shows mounting holes which serve to fasten the prism 1 in a measuring machine as illustrated in FIGS. 15 to 18.

It is considered obvious that the invention can be described or realized independently of this specific choice of a coordinate system and that other coordinate system axes can be selected which would not even need to form a rectangular tripod but would only have to be linearly independent of each other.

Figure 2:
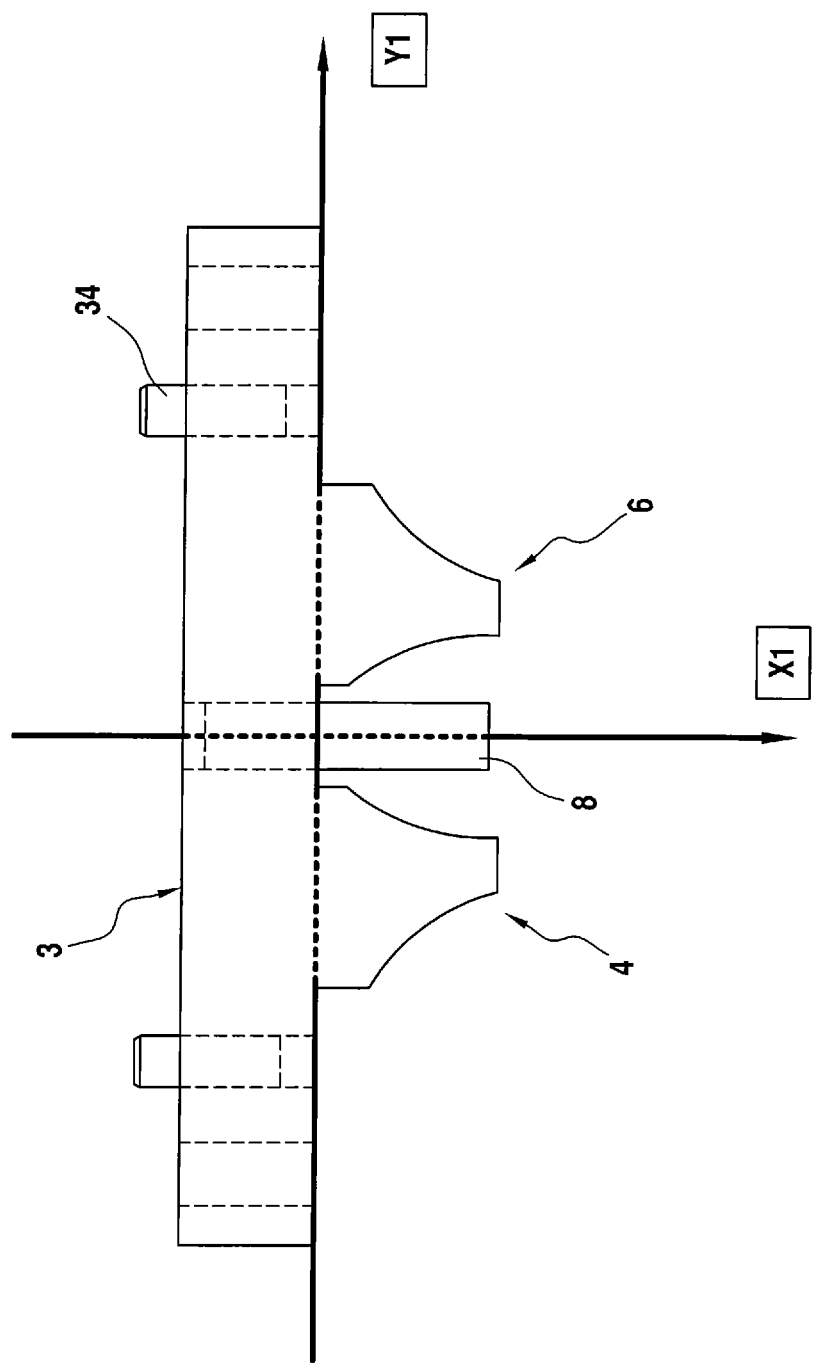
FIG. 2 shows the profile gauge in a side view.
Figure 3:
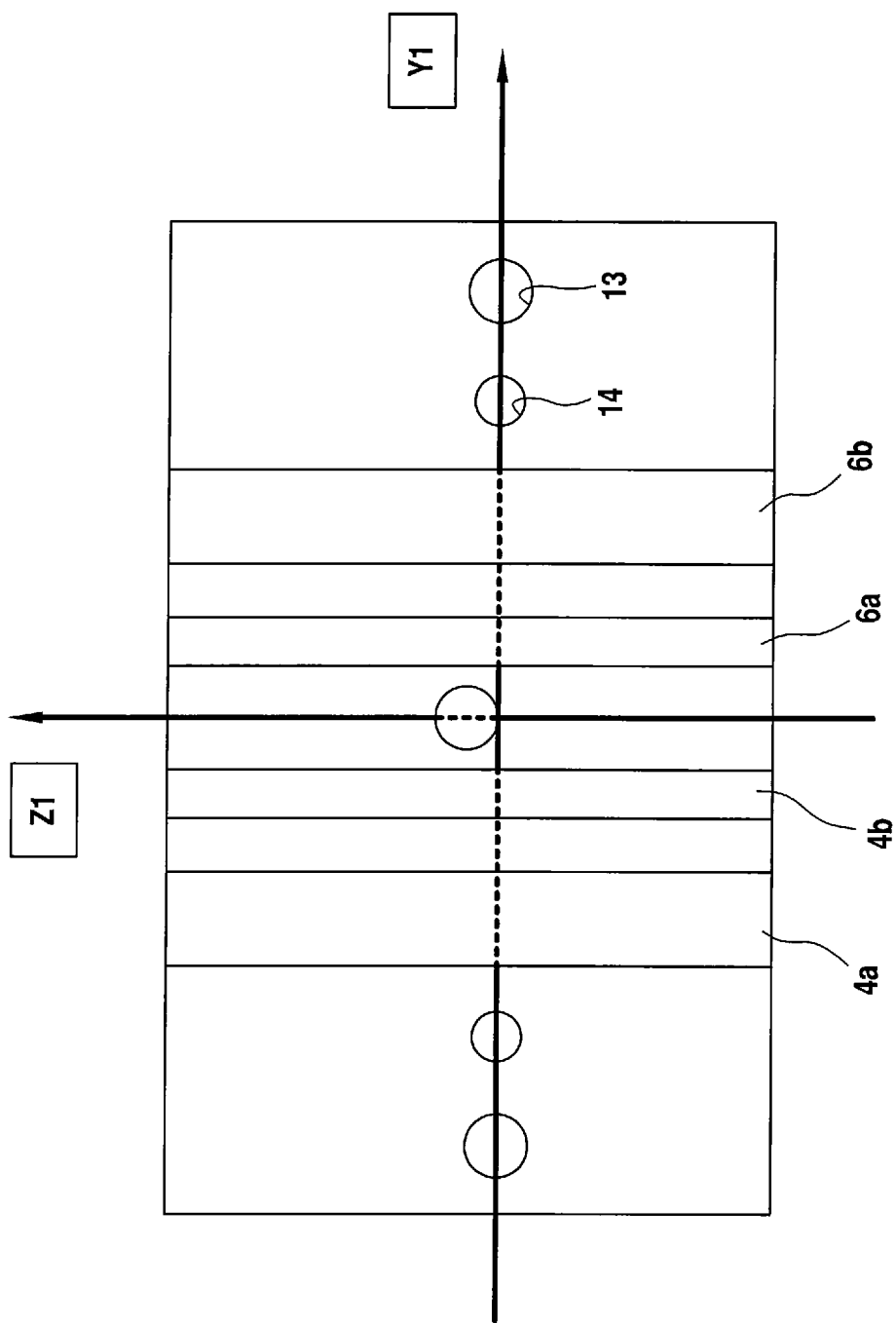
FIG. 3 shows the profile gauge in another side view.

FIG. 2 represents the prism 1 as seen from the Z1-direction, while FIG. 3 shows the prism 1 as seen from the X1-direction.

As has already been explained at the beginning, the tooth flanks 4, 6 represent an exact image of the tooth flanks of two consecutive teeth of an internally toothed profile of a work piece that is to be machined by skiving with a skiving tool which is measured with the prism 1. However, the four tooth flanks of the prism 1 would not necessarily have to be arranged in the manner illustrated here which is perpendicular to the upper end surface of the prism.

Relying on the fact that the engagement conditions of the skiving tool (skiving wheel) with the prism 1 are the same as with the work piece in the profile-forming phase, corresponding to the minimal axis distance between the rotary axes of the tool in the work piece in the skiving process, said minimal axis distance can be determined in a very simple way with the help of the prism 1, as will be explained in the following.

Figure 4:
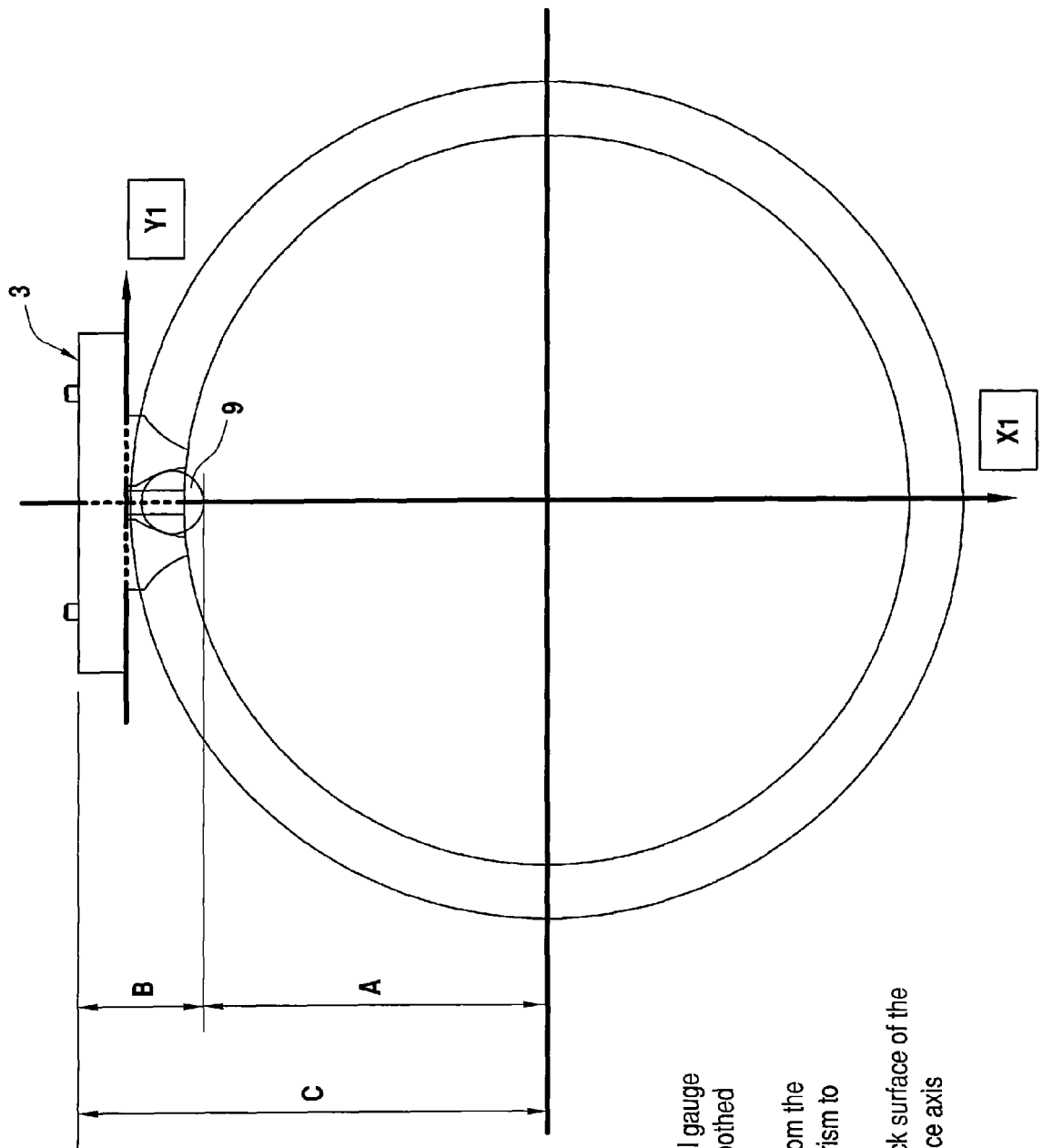
FIG. 4 illustrates the distance of a work piece axis from a reference location based on the profile gauge of FIG. 1.

First, as explained by way of FIG. 4, the distance of the work piece axis from a first reference can be determined, wherein the latter can be represented for example by the backside 3 of the prism 1. Using for example a cylindrical roller or a spherical ball 9, relative to which the work piece has a known or easily determined ball gauge diameter (2 times the distance labeled A between the ball 9 and the work piece axis), a distance B from the back surface 3 to the far side of the ball is measured. In this measurement of B, the ball contacts the two inner tooth flanks 4b and 6a in the area of the involute. The desired distance C can now be determined as the sum of A and B, i.e.

$$C = A + B,$$

wherein C stands for the distance of the backside 3 of the prism 1 from the work piece axis, A stands for one-half of the known ball gauge diameter of the internally toothed work piece, and B stands for the measured distance between the back surface 3 of the prism 1 and the ball 9. The X1-axis in this case represents the measurement axis.

To determine the distance D of the tool axis C2 from the first reference, i.e. from the back surface 3, the tooth flanks of the skiving wheel are brought into contact with the tooth flanks 4, 6 of the prism 1, as illustrated through FIGS. 6 to 9. The axis Z1 of the prism 1 is tilted by an angle $\Sigma$ relative to an axis of linear movement Z0 (explained hereinafter) of the associated measuring device. The tilt angle $\Sigma$ corresponds to the axis-crossing angle that is set for the skiving process. For a clear understanding of FIGS. 6 to 8, it should be noted that in the illustrated embodiment the tool axis C2 runs parallel to the axis Z0, so that the axis-crossing angle $\Sigma$ between the work piece axis and the tool axis is maintained and the engagement conditions are thus exactly duplicated.

Figure 5:
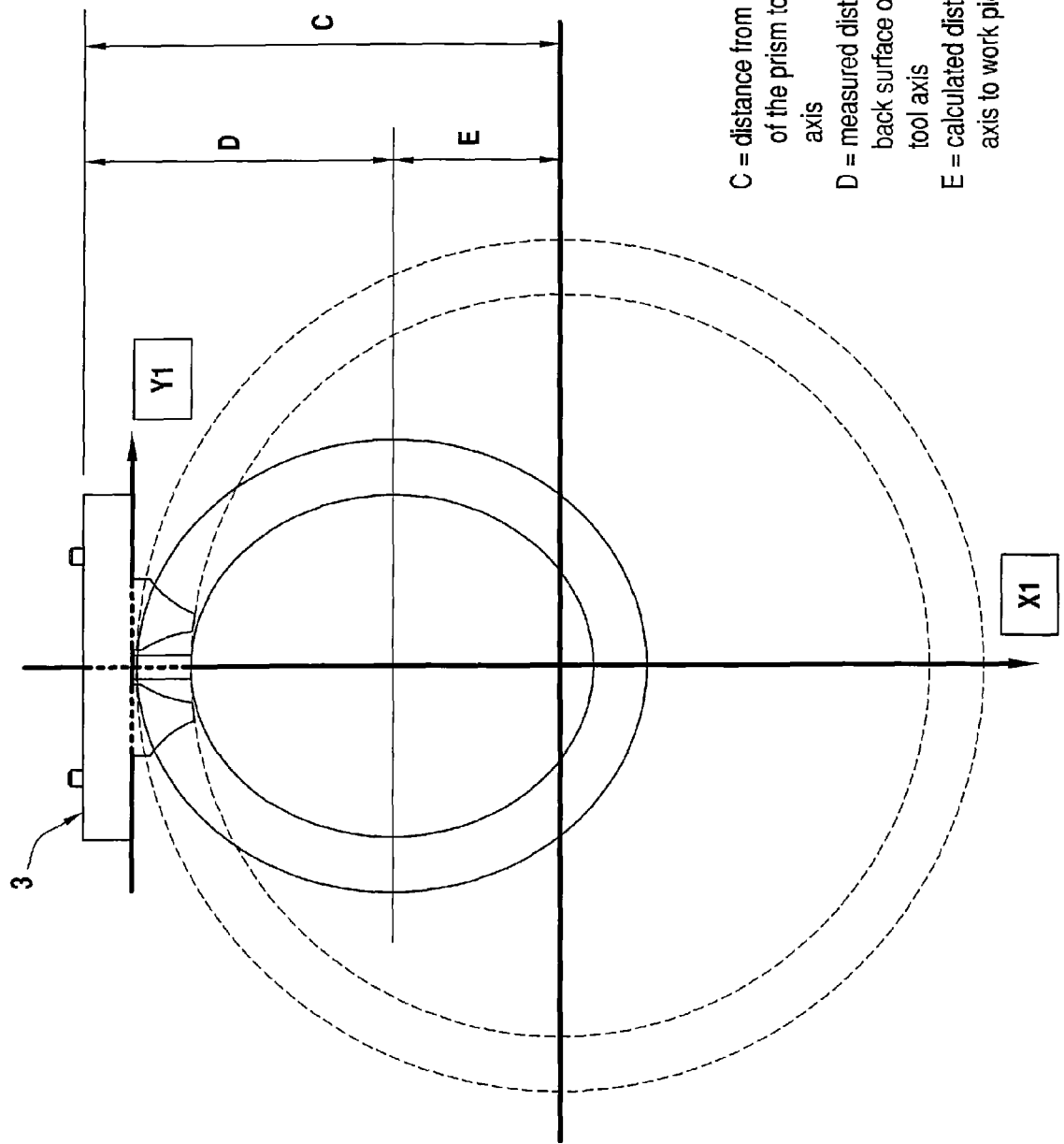
FIG. 5 illustrates the distance of a tool axis from the reference location in correlation with the situation of FIG. 4.
Figure 6:
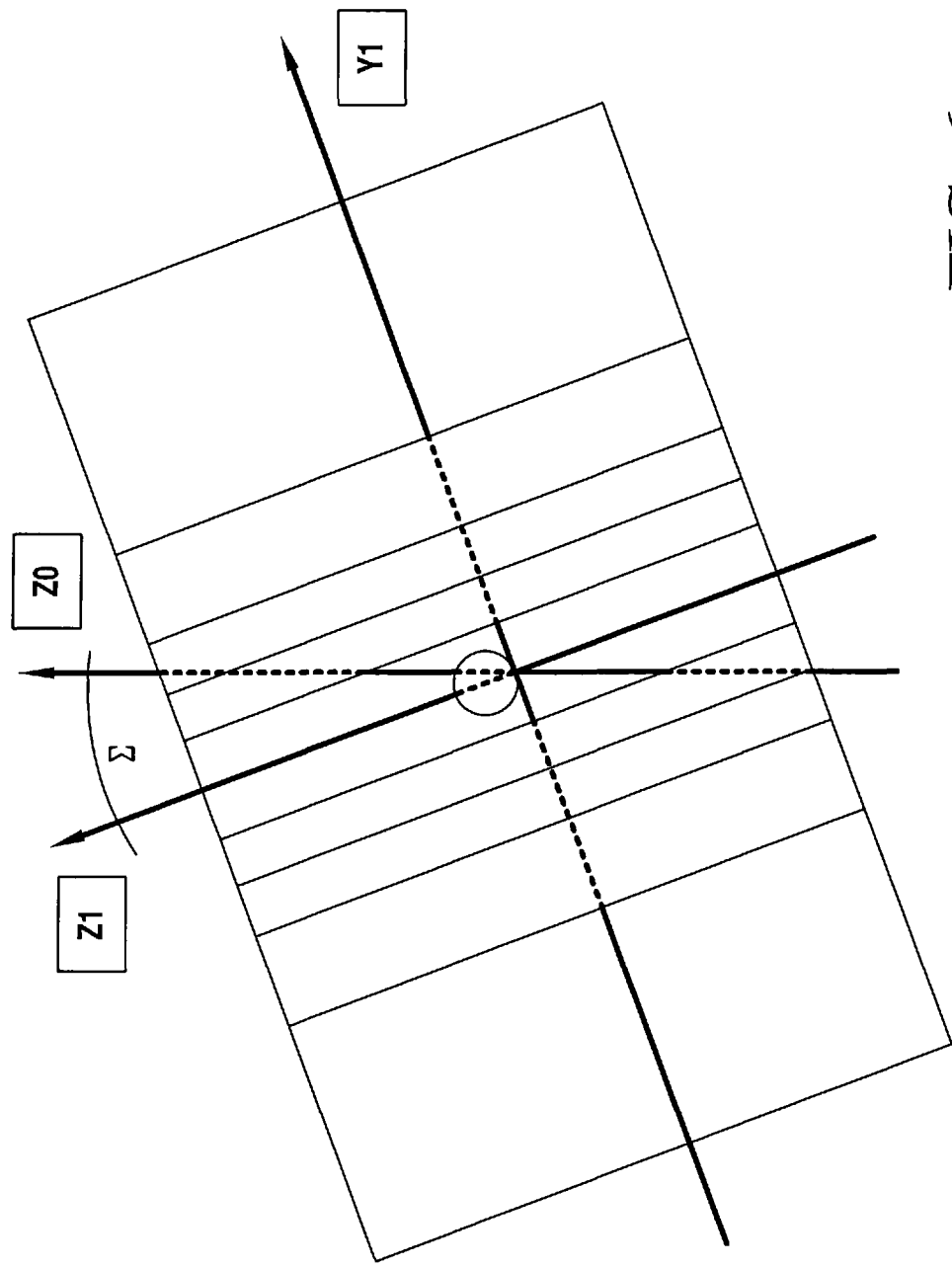
FIGS. 6 to 8 illustrate the arrangement of the profile gauge relative to an axis of movement of a measuring device.
Figure 7:
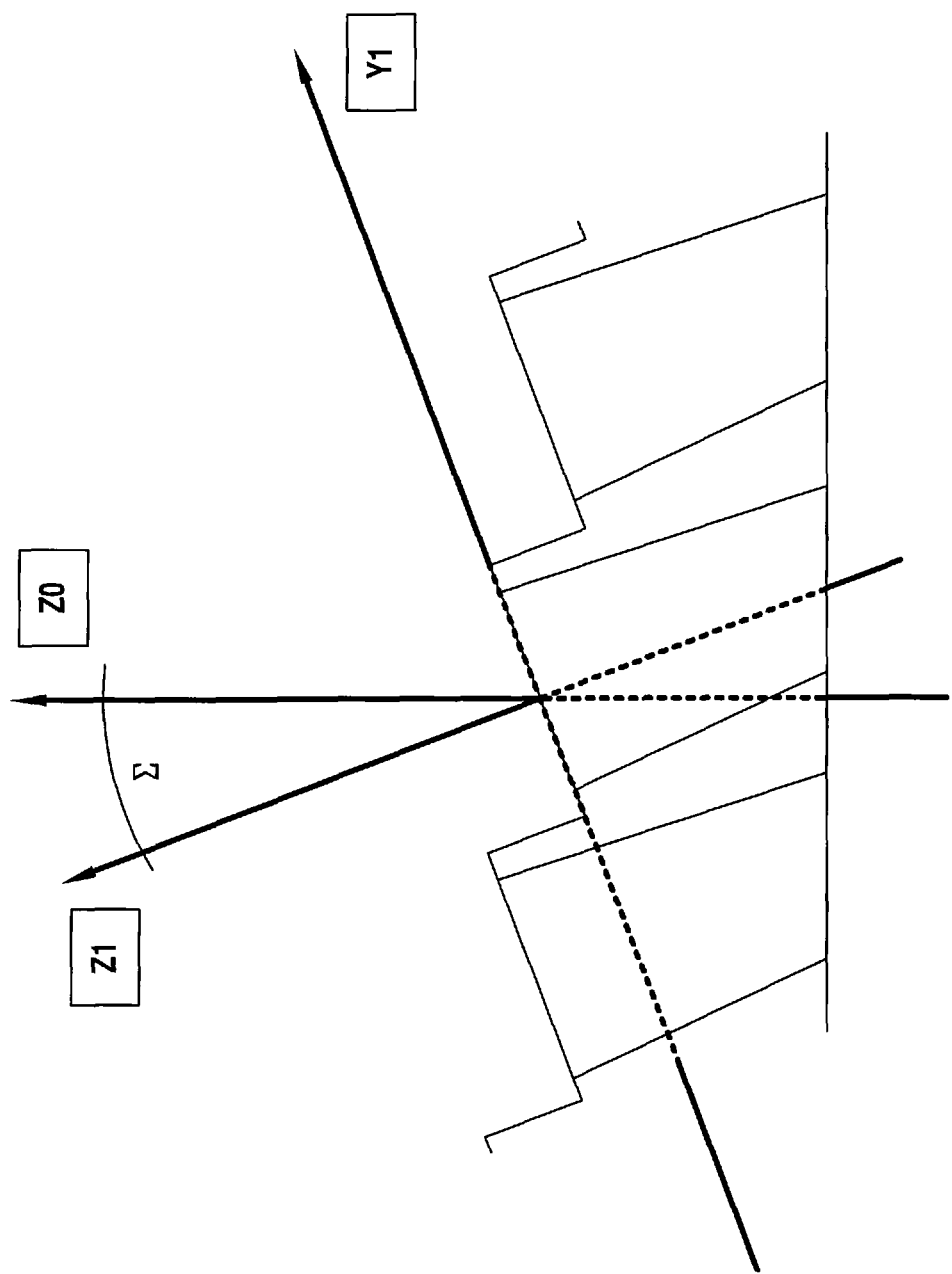
Figure 8:
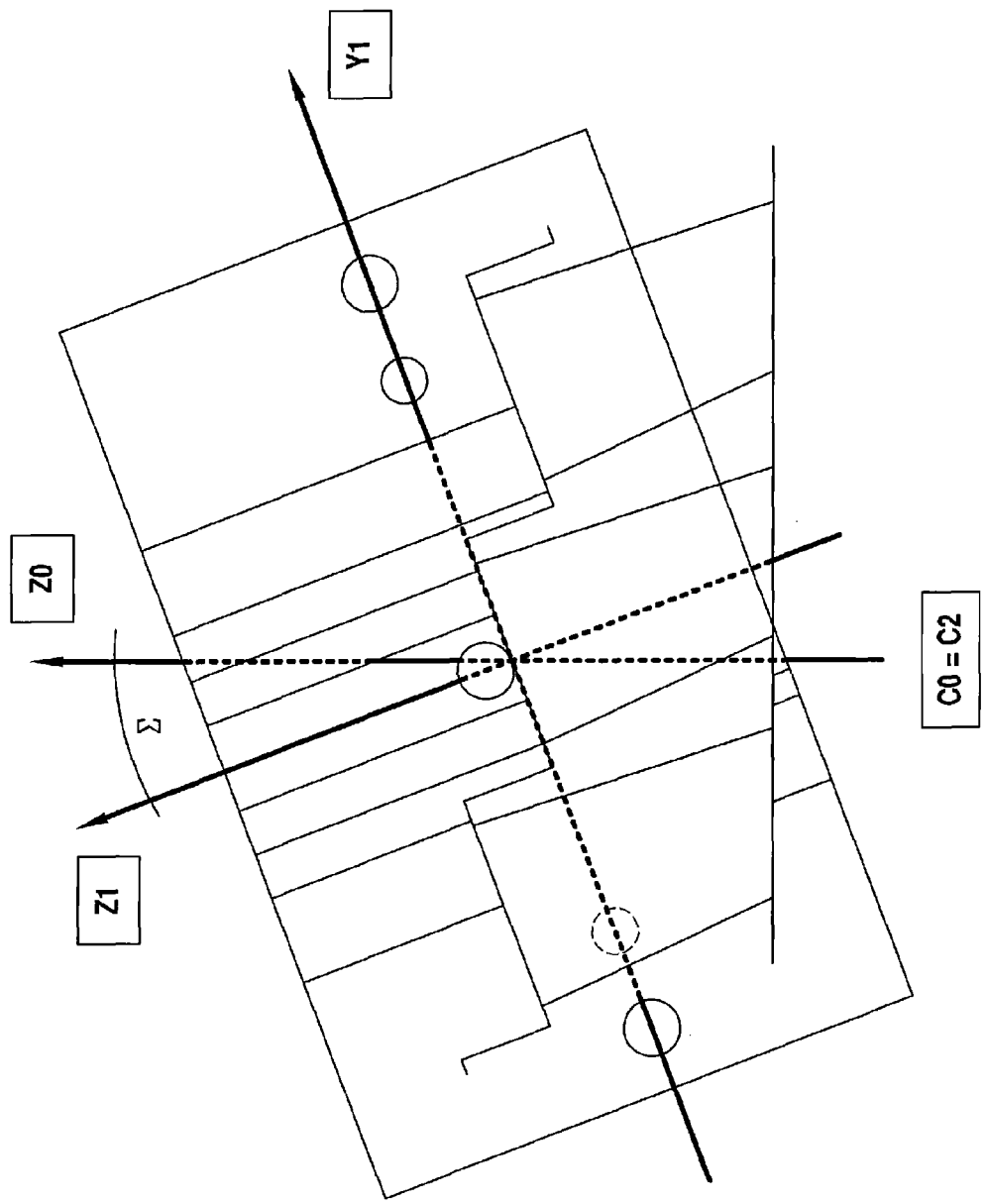
Figure 9:
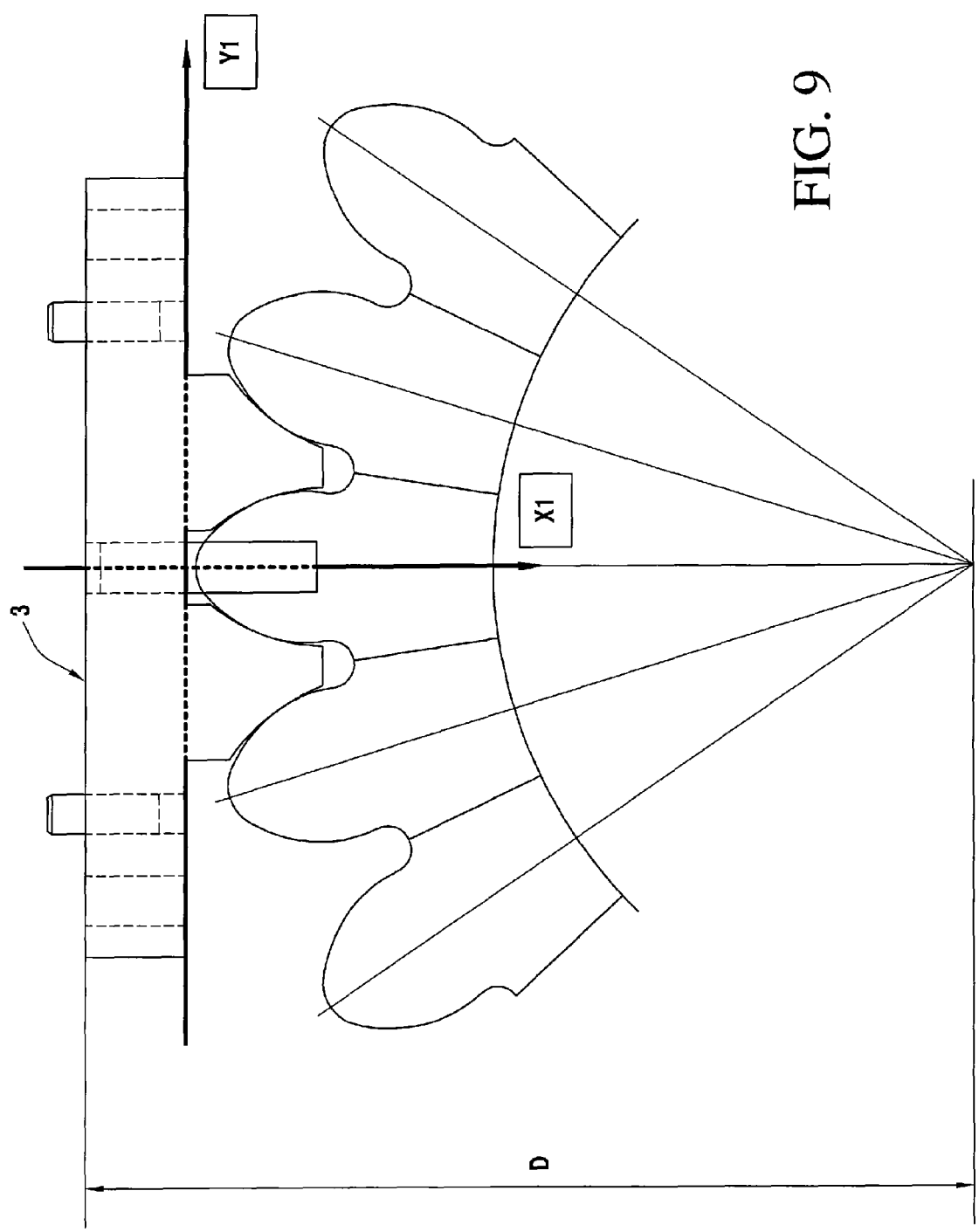
FIG. 9 illustrates the toothed profile engagement between the tool and the profile gauge.

While the engagement conditions are represented most clearly in FIG. 9, FIG. 5 illustrates the relationship whereby the minimal axis distance E between tool axis and work piece axis distance is obtained by subtracting the measured distance D between tool axis and the back surface 3 of the prism 1 from the distance C between the work piece axis and the back surface 3 of the prism 1, wherein the measurement and the calculation are again referenced to the axis X1 or the axis X0 (see FIG. 10) which runs parallel to it.

As is immediately evident from FIGS. 4 and 5, the specific choice for the location of the first reference, which is in this example the back surface 3 of the prism 1, is irrelevant. Another reference would serve the same purpose, as long as the same reference is used for the determination of the distance C and for the measurement of the distance D.

Thus, for the correct setting of the skiving machine, it is possible to use the exact minimal axis distance E between the skiving wheel axis C2 and the work piece axis C3, which is found through a suitable procedure of bringing the tool (skiving wheel) into engagement with the prism. The exact shapes of the work pieces and their teeth do not matter, it is possible for example to treat work pieces with involute tooth shapes as well as work pieces with other tooth shapes.

The foregoing explanations and contact conditions relate to the case where, for the machining of the work piece with the skiving wheel on the skiving machine, the so-called tool center point of the skiving wheel which is located on the outside diameter of the latter lies in a plane that contains the radial infeed axis and the vertical movement axis of the skiving machine. This is based on the customary configuration, where the radial infeed axis of the skiving machine intersects the table axis of the skiving machine, while the vertical movement axis of the skiving machine runs parallel to the table axis and intersects the infeed axis of the skiving machine, i.e. the work piece undergoes a skiving process without lateral offset.

FIGS. 10 to 14 represent different views of a measuring device that is based on the profile gauge described above by way of the example of the prism 1. The embodiment of the measuring machine shown here employs again a system of movement axes that are as convenient as possible to use. However, the invention is neither limited to this choice of axes nor to any specific way of realizing the motion units used to establish the contact between the skiving wheel and the prism.

The measuring machine 10 has a machine bed 12 on top of which a table 14 is arranged which is rotatable about the axis C0. A skiving tool in the form of a skiving wheel can be clamped to the table as usual with a clamping device in such a way that the rotary axis C2 of the skiving wheel coincides with the table axis C0 which, for the sake of simplicity, is in this case arranged vertically on the machine bed 12, but this is not strictly required. The arrangement further includes a rotary encoder which determines the angular position relative to a given reference for a rotation about the axis C0. Preferably, the skiving wheel is mounted on the table 14 in such a way that the cutting edges of the skiving wheel are oriented upward.

Figure 10:
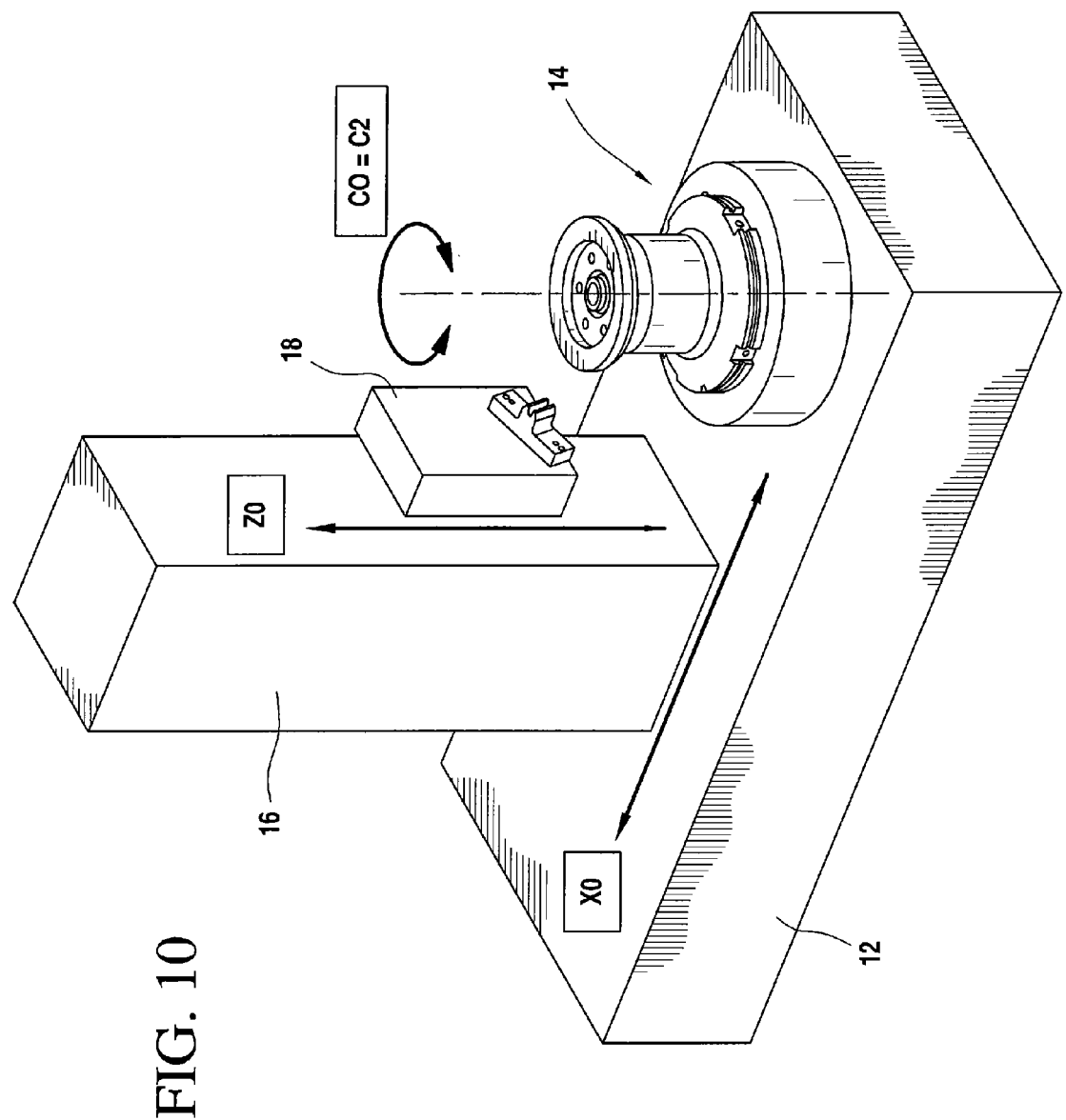
FIG. 10 shows a measuring device with the profile gauge in a perspective view.
Figure 11:
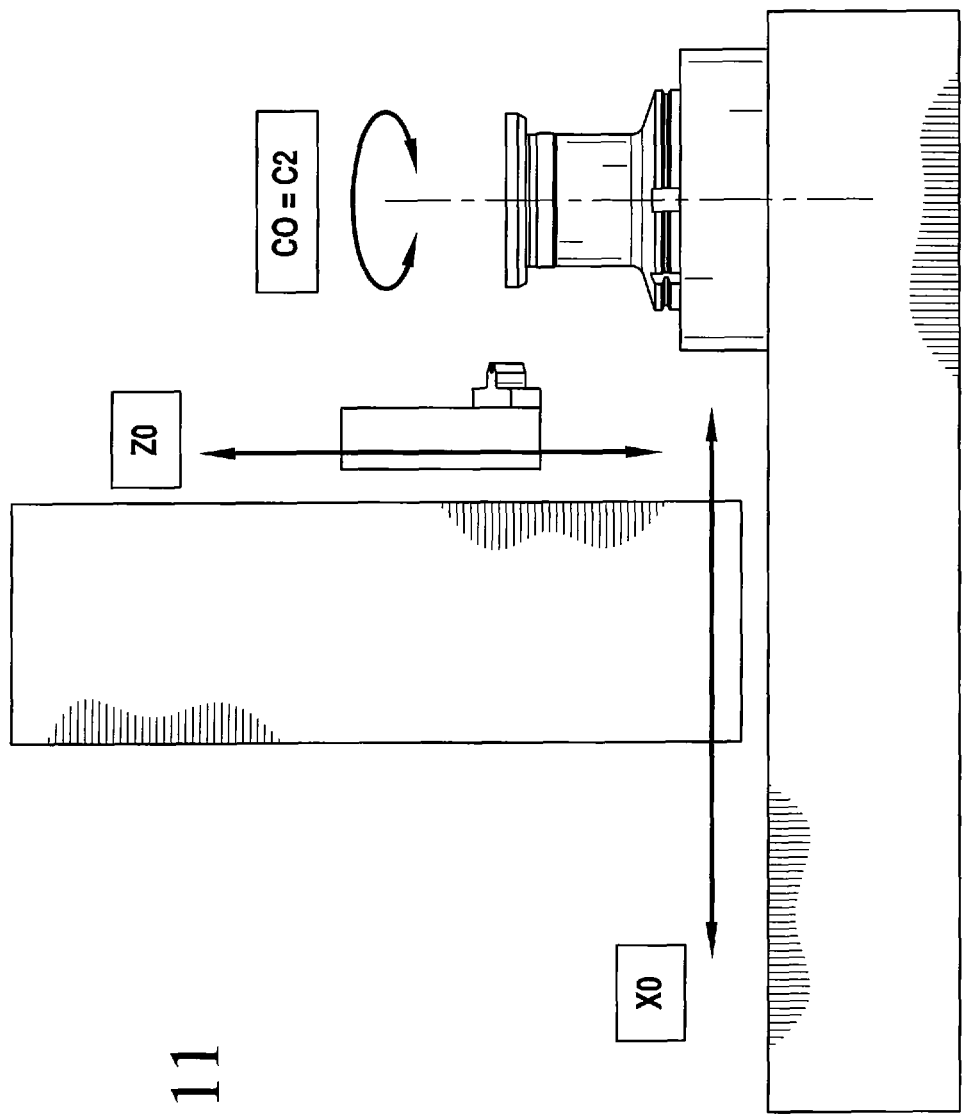
FIGS. 11 and 12 show side elevations of the measuring device.
Figure 12:
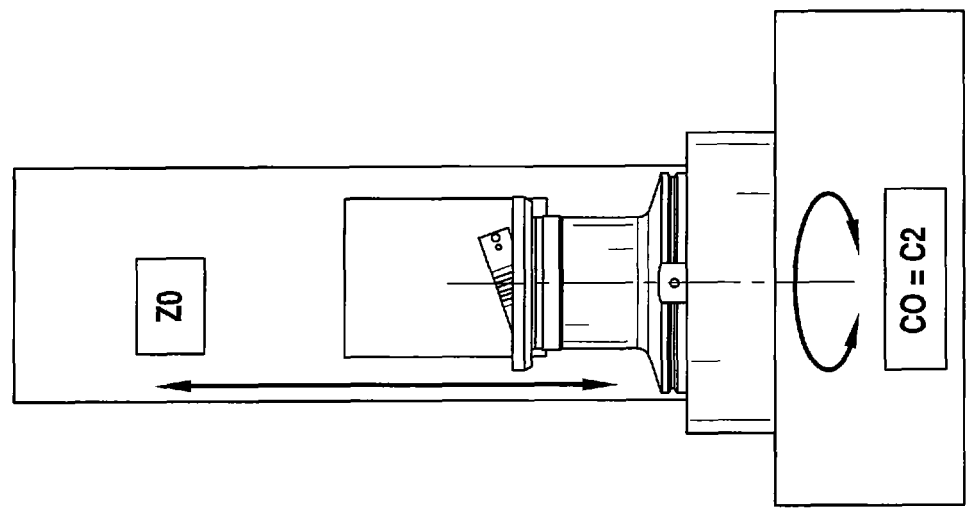
Figure 13:
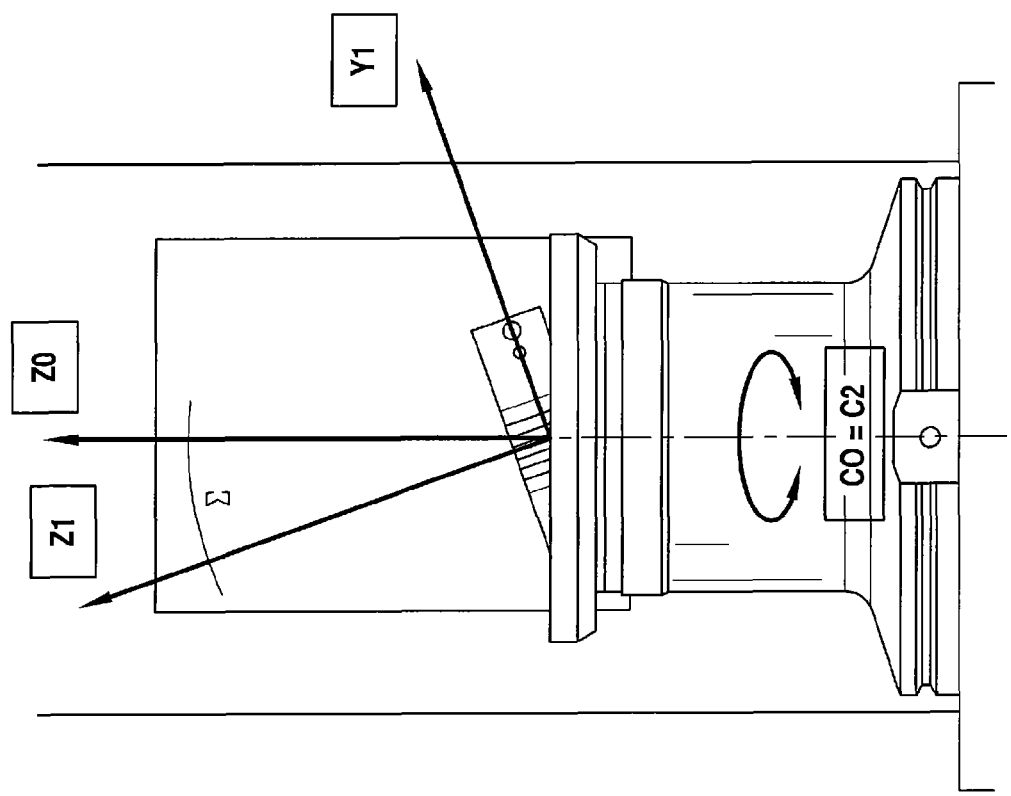
FIG. 13 shows an enlarged detail of FIG. 12.
Figure 14:
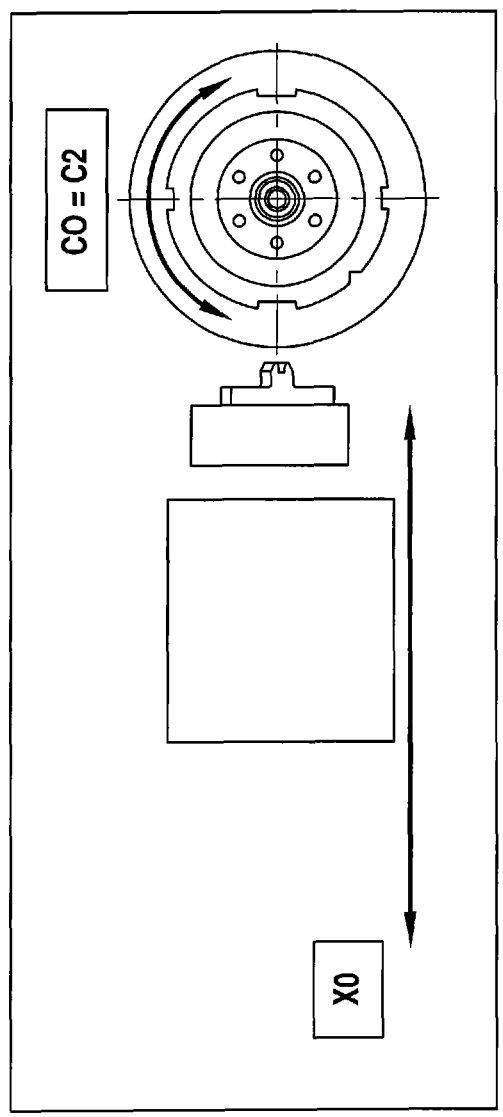
FIG. 14 shows a plan view of the measuring device of FIG. 10.

The measuring machine 10 further includes a column 16 which, as illustrated in FIG. 10, is horizontally movable on the bed along the axis X0 in a radial direction relative to the table axis C0. The horizontal arrangement is again not strictly required, and neither is the choice of the axis X0 of the machine coordinate system as an axis that intersects the table axis. Arranged on the movable column 16 is a carriage 18 which, in this example, is movable on the column 16 along a vertical axis Z0. The carriage holds the prism 1 in the orientation shown in FIG. 6 where the axis Z1 of the prism 1 is inclined from the axis Z0 by the axis-crossing angle $\Sigma$ which is a machine setting that is made in the skiving process (in the case where there is no lateral offset). Further, for the sake of simplicity, the X1-axis of the prism 1 has been selected to run parallel to the X0-axis of the measuring instrument 10 and to cross the table axis C0.

To make the measurement, as already explained above, the tooth flanks 4, 6 of the prism are brought into contact with the tooth flanks of the skiving wheel. Dependent on the design of the skiving wheel and on the profile-forming contact line between the tooth of the skiving wheel and the gap of the toothed profile on the work piece, the tooth flanks of the skiving wheel may come into contact only with the two outer tooth flanks 4a, 6b of the prism 1, with all four tooth flanks 4a, 4b, 6a, 6b of the prism 1, or only with the two inner tooth flanks 4b, 6a of the prism 1. Furthermore, the prism 1 is preferably configured in such a way that contact occurs only between the tooth flanks of the skiving wheel and the prism 1, but that contact of the tip- and root areas of the skiving wheel with, respectively, the root- and tip areas of the prism 1 is avoided.

Following is an explanation of the function of the positioning post 8. The latter allows an additional measurement to be taken which provides information in regard to the height position of the cutting edge of the skiving wheel. The positioning post 8, which is cylindrical in this example, is positioned in the prism 1 in such a way that, with an arrangement of the skiving wheel with the cutting edges facing upward as described in the context of FIG. 10, the positioning post 8 will make contact at its underside with the cutting edge of the tooth tip of the skiving wheel. In this example, but not as a strict requirement, the contact takes place at the outside diameter of the skiving wheel. Further, for the sake of simplicity, the central axis X1 of the prism can be selected so that the contact takes place in the central axis X1. Accordingly, the cylinder axis of the positioning post is located above the central axis X1 of the prism 1. Although a parallel arrangement of the post axis and the axis X1 of the prism is preferred for simplicity's sake, such an arrangement is likewise not strictly required.

Using the axis Z0 of the measuring machine 10 as measurement axis, the height of the skiving wheel from the contact point of the skiving wheel, which lies on the cutting edge and preferably also on the outside diameter of the skiving wheel, can be measured relative to a height reference that is associated with the skiving wheel. This height reference can be, for example, the backside of the skiving wheel, but in view of the fact that the skiving wheel and the skiving wheel holder remain connected to each other, the height reference can also be on the skiving wheel holder, for example its underside.

Furthermore, by using the table axis C0 as a measurement axis and in particular by simply using the rotary encoder of the table, the angular position of the contact point between the positioning post and the cutting edge (and the outside diameter) of the skiving wheel can be measured directly, and the result can be used to calculate the relative azimuthal position of the contact point against a geometrical reference feature that may be located for example on the backside of the skiving wheel. For this third, azimuthal reference, one could also use other geometrical features as long as the angle measurement provides appropriate information to ensure that the toothed profile that is to be produced on the work piece will have a specified angular position for example relative to another, already existing toothed profile of the work piece.

In this example, the two (in some cases three) values determined in this manner (minimum axis distance, height, and in some cases the angular position) are entered as inputs into the controller of the skiving machine. The objective of obtaining a specified tooth width as well as a quality level of the toothed profile within given tolerance limits can thereby achieved more easily, as well as (if applicable) a specified angular position of the toothed profile to be cut in relation to another toothed profile or geometric feature of the work piece within a given tolerance.

Following is a description on how the prism 1 can be mounted on the measuring device 10. Of the mounting holes that are shown in FIGS. 1, 2, 3, 6, 8 and 9, the larger holes 13 are intended for screws and the smaller holes for precise locating pins 34 which serve to accurately position the prism 1 on the holder device of the Z0-carriage of the measuring device 10.

For simplicity's sake, it may be assumed that the locating pins 34 define within the prism an axis that intersects the central axis X1 of the prism 1 at a right angle. Figuratively speaking, the positioning post borders tangentially on this axis.

Figure 15:
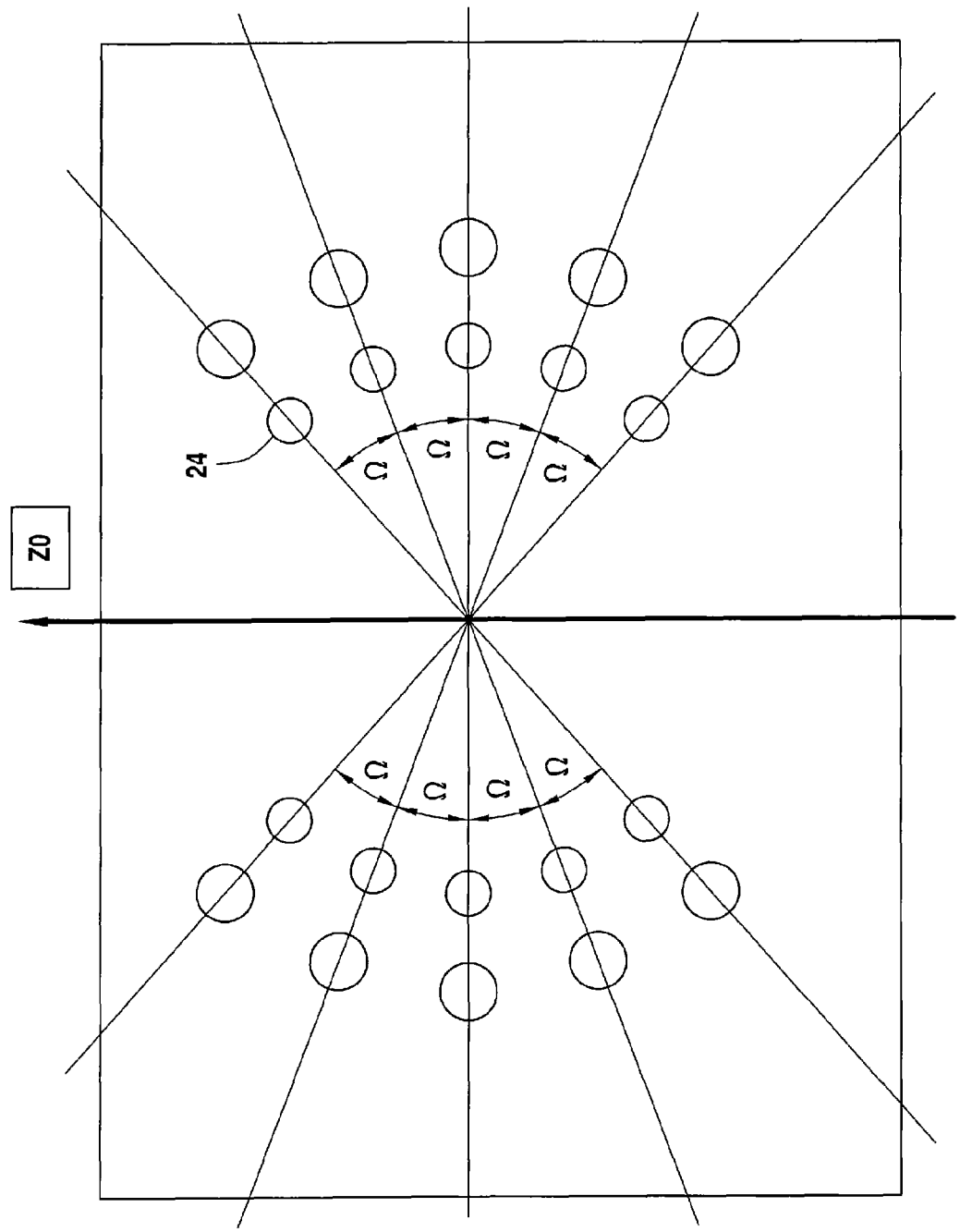
FIGS. 15 to 18 illustrate a possible setup procedure.

FIG. 15 represents a plate which is arranged on the Z0-carriage of the measuring device 10 and contains holes 24 for the locating pins, wherein the holes 24 are arranged in pairs across from each other on a respective axis and at the same distance from each other as the holes 14 of the prism. The axes of the pairs of holes 24 for the locating pins intersect each other in this example at their origins and on the Z0-axis of the measuring device. The axes of the holes 24 for the locating pins are rotated relative to each other by an angle $\Omega$ of, e.g., 10 degrees. For simplicity's sake, the plate is arranged parallel to the Z0-axis and at a right angle to the X0-axis of the measuring device.

Figure 16:
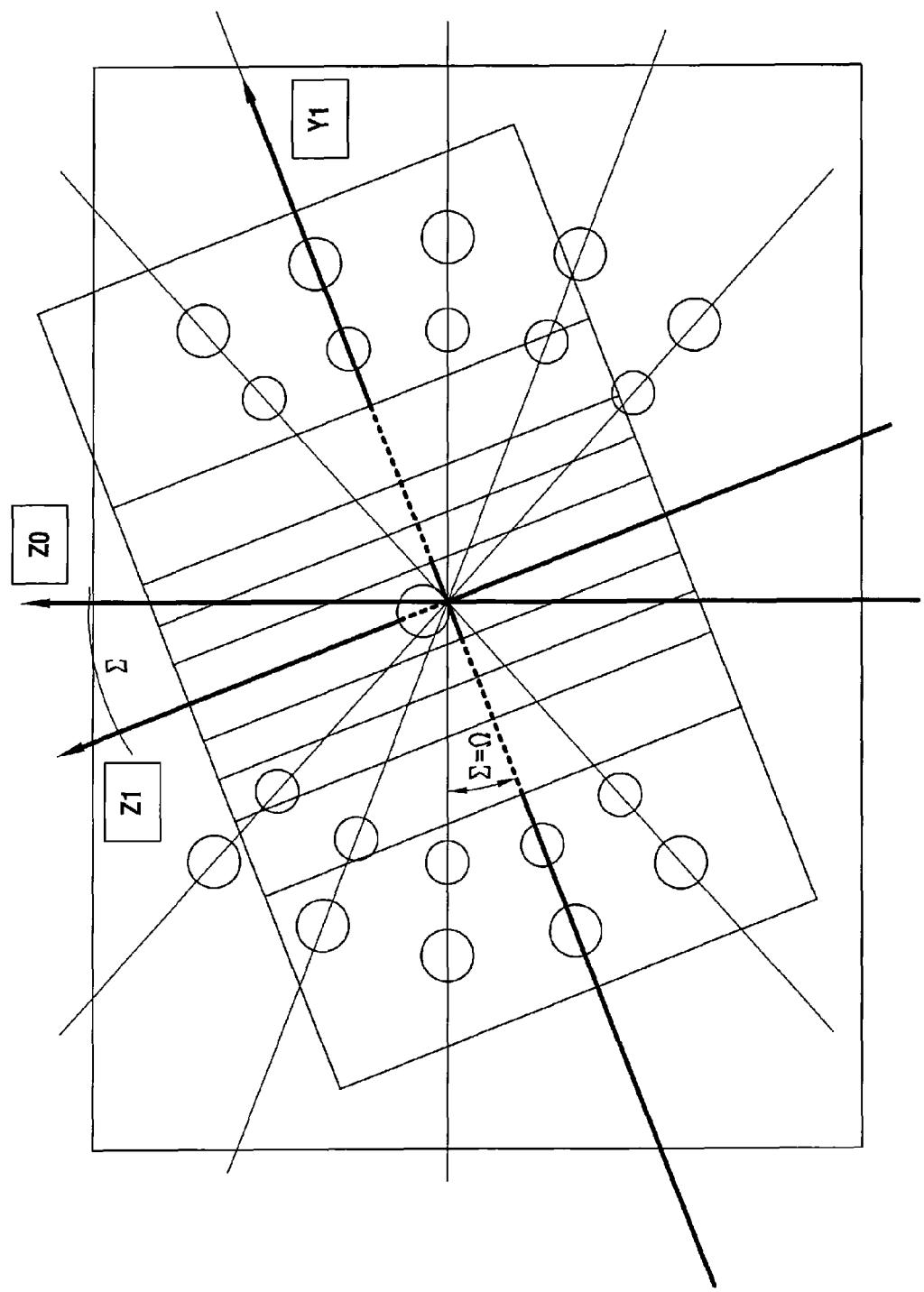

FIG. 16 represents a prism which is mounted on this plate at an axis-crossing angle of e.g. 10 degrees. The angular position of the prism follows in this case the given angular steps of the positions of the holes 24 of the plate on the Z0-carriage. As is apparent from the drawing, with this choice of a coordinate system the central axis of the prism runs through the origin of the plate coordinates and the positioning post borders tangentially on the Y1-axis (which corresponds to the cutting edge of the tool).

Figure 17:
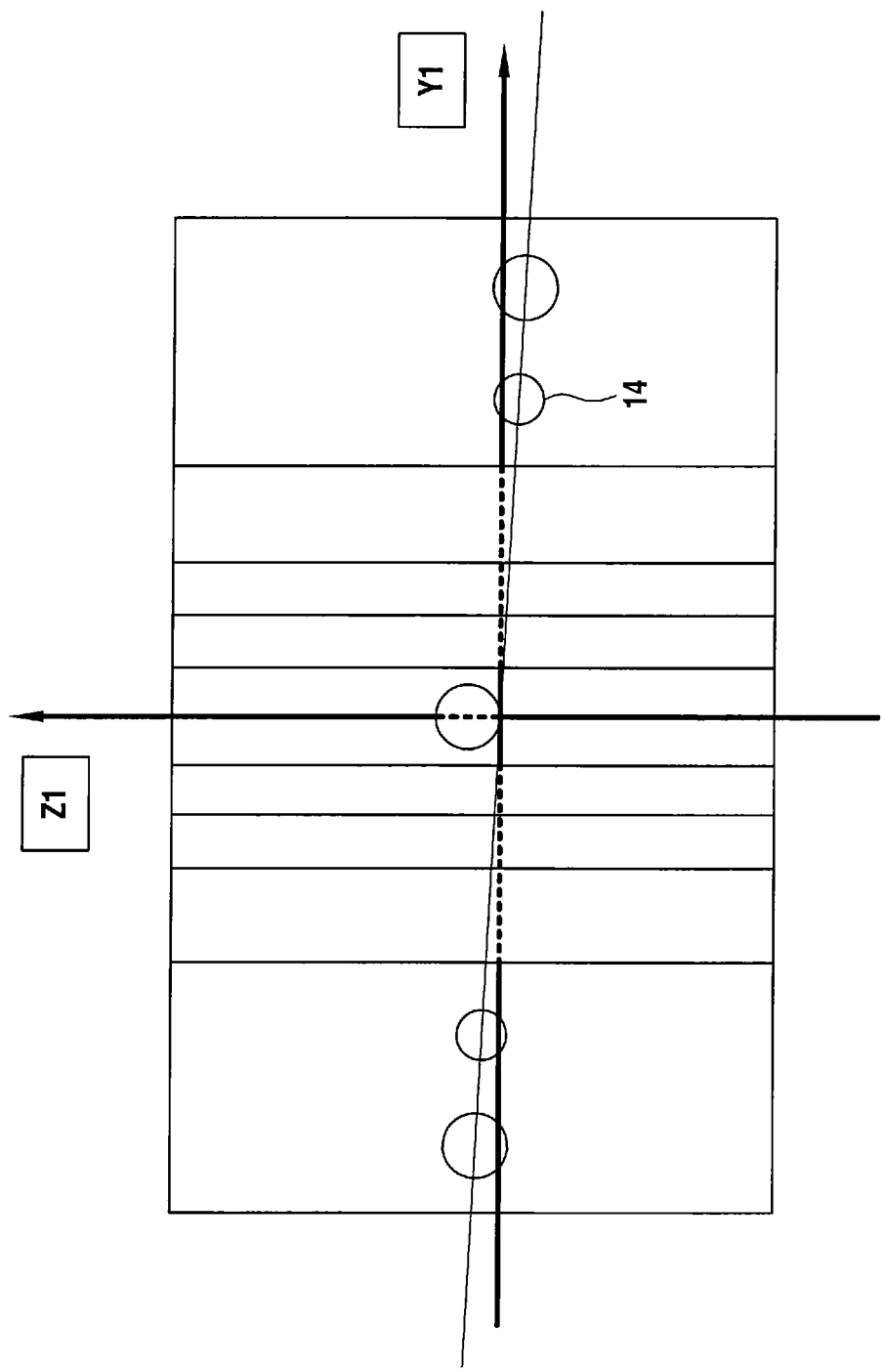
Figure 18:
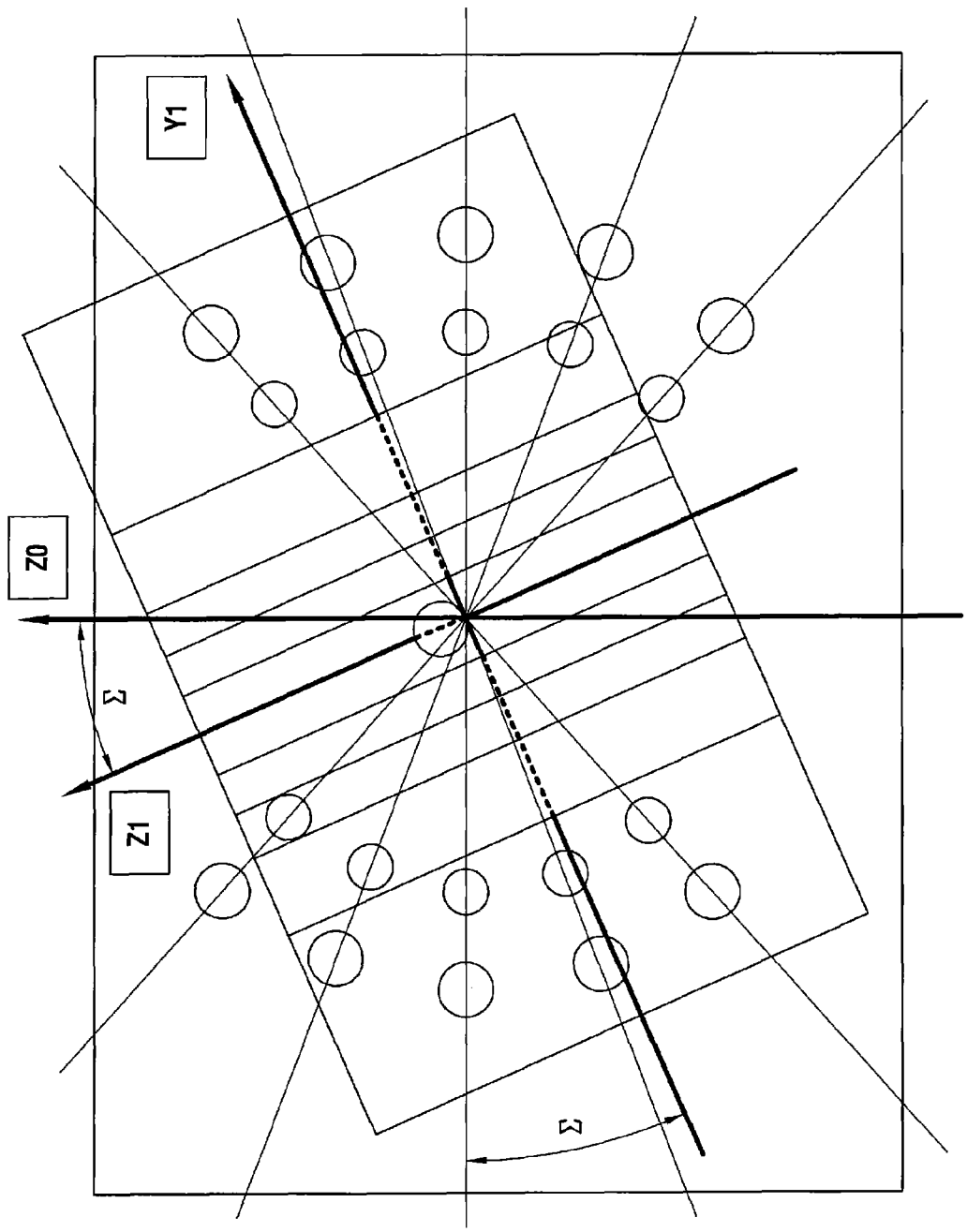

In contrast to the above, FIG. 17 represents a prism where the axis defined by the locating pins 34 is inclined relative to the Y1-axis by, e.g., two degrees. This situation can occur for example in a case where an axis-crossing angle different from 10 or 20 degrees (i.e. not an integer multiple of $\Omega$) needs to be set. According to the mounting procedure for such a prism as illustrated in FIG. 18, the axis of the locating pins of the prism, i.e. the axis of the locating-pin holes in the plate of the Z0-carriage, no longer lies on the Y1 axis, so that the bigger axis-crossing angle of, for example 12 degrees, can be set in this example.

It should be noted at this point that the arrangement described in FIGS. 15 to 18 of mounting the prism on a carriage that is movable along an axis of linear movement represents only one of several conceivable possibilities, allowing in particular a simple design configuration of the measuring device. Still, any arrangement of holes is possible, including fastening concepts without any screws. The prism could for example also be clamped down at some of its surfaces. In particular the stepless setting of a desired axis-crossing angle is also among the possibilities.

The measuring device can also have an A-axis (rotary axis) relative to which an angle of rotation can be set in stepless variation. Ideally in this case, the prism 1 is positioned with its X1-axis parallel to the A-axis which, in turn, runs parallel to the X0-axis and intersects the axis C0 (or C2).

In some cases the skiving process can for various reasons be performed with a lateral offset, which means that the so-called tool center point of the skiving wheel which is located on the outside diameter of the skiving wheel does not lie in the plane that is defined by the radial infeed axis of the skiving machine (which intersects the table axis of the skiving machine) and by the vertical movement axis of the skiving machine (which runs parallel to the table axis C0 of the skiving machine and intersects the infeed axis of the skiving machine).

One reason for using the lateral offset can be the fact that it increases the effective relief angles. Thus, instead of being limited to conical tools, it is possible to also use cylindrical tools which can have a longer useful life, or a longer re-sharpening interval, and are also somewhat less complicated to produce. A lateral offset can also have the purpose of avoiding collisions between the skiving wheel holder/skiving wheel and the work piece or the clamping device that holds the work piece.

Even with a lateral offset, the tooth flanks of the prism can still represent an exact image of the flanks of the toothed profile that is to be machined. The position of the tooth flanks on the measuring machine now changes in accordance with the tooth engagement that is to be maintained. The angle between the Z1-axis of the prism 1 and the Z0-axis of the measuring device in this case no longer corresponds to the axis-crossing angle $\Sigma$ at which the skiving wheel is inclined during the machining of the work piece on the skiving machine. Instead, a new calculation is made to determine the angle between the Z1-axis of the prism 1 and the Z0-axis of the measuring machine 10, and the position setting of the prism 1 on the measuring machine 10 is adjusted accordingly. In addition, the tooth traces of the flanks of the prism need to be inclined relative to the back wall by an angle that depends on the magnitude of the lateral offset (or alternatively, the entire prism needs to be tilted about the Y1 axis, giving up the parallelism between the Z0-direction and the plane of the backside 3, a concept which can be realized by providing the measuring machine with a tilt capability about a tilt axis Y0 parallel to Y1). In a similar way, one could realize an additional tilt angle of the skiving wheel plane relative to the plane that runs orthogonal to the work piece axis in the skiving process, as described for example in EP 2 537 615. The calculations required for this will be familiar to a person skilled in the art, based on the calculations that are used for the design of a skiving wheel as a function of a desired lateral offset in the skiving process. In the case of generating cutter wheels, these considerations take on a more elementary form, due to an axis-crossing angle of zero.

As an additional comment, the method described above can also be used for the determination of the exact height of the skiving wheel or of the functional unit of the skiving wheel and its holder device, or also for the determination of the angular position of the teeth relative to the third reference in cases where in regard to the tooth width the conventional practice of providing the outside diameter of the skiving wheel is adequate. This is particularly the case in applications where the primary requirement is to accurately meet a given root circle diameter and where it is less important to accurately meet a specified tooth width, as is the case with many spline profiles, where the conventionally available outside diameter of the skiving wheel anyway takes precedence over the axis distance setting on the skiving machine.

What is claimed is:

1. Profile gauge (1) embodying a measurement geometry for a toothed tool with geometrically defined cutting edges for the machining of toothed profiles on work pieces through rolling engagement of the tool with the work piece, wherein the profile gauge serves for the determination of at least one measurement quantity for use in a machining process, that is to be performed with the tool,
  wherein during a phase of said machining process the toothed profile to be generated on the work piece is formed by a meshing engagement with the toothed profile of the tool, said profile gauge being characterized by a toothed profile section (4, 6) with which, for determining the measurement quantity, the teeth of the tool are brought into a meshing engagement that is representative of the tooth engagement between the tool and the work piece during the profile-forming phase, said profile gauge further comprising a post-like positioning element (8) protruding on the side of the toothed profile section with its main dimension oriented in the direction (X1) of the tooth height to make contact with the cutting edge of the tooth tip of the tool at its outside diameter.

2. Profile gauge according to claim 1, wherein the toothed profile section of the profile gauge duplicates at least a section of the tooth flanks of the toothed profile of the work piece.

3. Profile gauge according to claim 2, wherein the duplication of at least a section comprises at least one left flank and one right flank of the toothed profile of the work piece.

4. Profile gauge according to claim 2 wherein the duplication of at least a section comprises two tooth flanks (4b, 6a) that face each other across a gap, and/or two tooth flanks (4a, 6b) that face away from each other and belong to two neighboring teeth.

5. Profile gauge according to claim 1 comprising a base (2) which on one side carries the toothed profile section (4, 6), formed out of one piece with said base, and which is of a planar configuration on its backside (3).

6. Profile gauge according to claim 1 wherein a measurement quantity contains information regarding the distance (D) between the rotary axis (C2) of the tool and a first reference associated with the profile gauge, wherein said first reference is a backside (3) of the base.

7. Profile gauge according to claim 1, wherein a measurement quantity contains information regarding the height distance between a contact point of the positioning element and a second reference that is associated with the tool.

8. Profile gauge according to claim 1 wherein a measurement quantity contains information regarding an angular position of a contact point of the positioning element relative to a third, azimuthal reference associated with the tool, wherein said third reference being constituted by a geometrical feature of the tool that interrupts the rotational symmetry of the latter.

9. Measuring device (10) comprising:
   a tool holder for a tool with geometrically defined cutting edges for machining a work piece through rolling engagement with the latter, and
   a profile gauge (1) according to claim 1 wherein the spatial relationship between the profile gauge and the tool holder device is variable.

10. Measuring device (10) according to claim 9, wherein the holder device is supported so as to be rotatable about a rotary axis (C0) wherein the holder device holds the tool whereby the rotary axis (C2) of the tool coincides with the rotary axis (C0), wherein an angular position transducer is arranged for the determination of the rotary position of the tool when the teeth of the latter are in meshing engagement with the profile gauge.

11. Measuring device (10) according to claim 9 wherein the radial distance between the tool and the profile gauge is variable along a first axis of linear movement (X0), whereby their tooth profiles can be brought into mutual engagement with each other.

12. Measuring device (10) according to claim 9 wherein the height position of the profile gauge relative to the tool axis is variable, whereby the post-like positioning element (8) is positionable to contact the tool along a second axis of linear movement (Z0) which runs parallel to the rotary axis (C0).

13. Measuring device (10) according to claim 9 further comprising a controller which acquires and/or stores information concerning the relative position between tool and profile gauge relative to the first axis of linear movement (X0), the second axis of linear movement (Z0) and/or the rotary axis (C0).

14. Measuring device (10) according to claim 9 wherein the tool holder is removable from said measuring device and installable on a gear-cutting machine tool together with the tool that is attached to the holder.

\* \* \* \* \*